(12) United States Patent
Park

(10) Patent No.: US 10,796,127 B2
(45) Date of Patent: Oct. 6, 2020

(54) ULTRASONIC TRANSDUCERS EMBEDDED IN ORGANIC LIGHT EMITTING DIODE PANEL AND DISPLAY DEVICES INCLUDING THE SAME

(71) Applicant: Samsung Electronics Co., Ltd., Suwon-si, Gyeonggi-do (KR)

(72) Inventor: Kyung Bae Park, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 16/232,310

(22) Filed: Dec. 26, 2018

(65) Prior Publication Data

US 2019/0197284 A1 Jun. 27, 2019

(30) Foreign Application Priority Data

Dec. 27, 2017 (KR) .................. 10-2017-0181391

(51) Int. Cl.
*G06K 9/00* (2006.01)
*G06F 3/043* (2006.01)
(Continued)

(52) U.S. Cl.
CPC ........... *G06K 9/0002* (2013.01); *G06F 3/017* (2013.01); *G06F 3/0412* (2013.01); *G06F 3/0436* (2013.01); *H01L 27/323* (2013.01); *H01L 27/3225* (2013.01); *H01L 27/3234* (2013.01); *H01L 27/3244* (2013.01); *H01L 51/5218* (2013.01); *H01L 51/5234* (2013.01);
(Continued)

(58) Field of Classification Search
None
See application file for complete search history.

(56) References Cited

U.S. PATENT DOCUMENTS 9,815,087 B2 11/2017 Ganti et al.
2009/0001853 A1* 1/2009 Adachi ................ A61B 8/4483
310/323.19

(Continued)

FOREIGN PATENT DOCUMENTS

KR 20160096648 A 8/2016

*Primary Examiner* — Nicholas J Lee
(74) *Attorney, Agent, or Firm* — Harness, Dickey & Pierce, P.L.C.

(57) ABSTRACT

An ultrasonic transducer-embedded organic light emitting diode (OLED) panel having excellent sensitivity and that is capable of providing high frequency output and biometric recognition is provided. An OLED panel may include a substrate, an OLED light emitting part on the substrate, the OLED light emitting part configured to emit visible light, and an ultrasonic output part between the substrate and the OLED light emitting part, the ultrasonic output part including an ultrasonic transducer configured to generate ultrasonic waves according to an excitation voltage. The ultrasonic transducer may be a capacitive ultrasonic transducer or a piezoelectric ultrasonic transducer. An OLED panel may include multiple ultrasonic transducers, and a control system may selectively control one or more ultrasonic transducers of the plurality of ultrasonic transducers based on a determination of whether to implement recognition of a three-dimensional gesture or touch recognition of an object in contact with the OLED panel.

18 Claims, 20 Drawing Sheets

(51) Int. Cl.
*G06F 3/01* (2006.01)
*G06F 3/041* (2006.01)
*H01L 27/32* (2006.01)
*H01L 51/52* (2006.01)
*B06B 1/06* (2006.01)
*B06B 1/02* (2006.01)

(52) U.S. Cl.
CPC ........... *B06B 1/0207* (2013.01); *B06B 1/0292* (2013.01); *B06B 1/0622* (2013.01); *B06B 2201/70* (2013.01); *H01L 2251/5338* (2013.01)

(56) References Cited

U.S. PATENT DOCUMENTS

| | | | |
|---|---|---|---|
| 2012/0001207 A1* | 1/2012 | Lee | H01L 51/5203 257/89 |
| 2013/0116568 A1* | 5/2013 | Certon | A61B 8/4483 600/447 |
| 2015/0169136 A1* | 6/2015 | Ganti | G06F 3/0436 345/177 |
| 2016/0107194 A1 | 4/2016 | Panchawagh et al. | |
| 2016/0107198 A1 | 4/2016 | Ackley et al. | |
| 2016/0110025 A1 | 4/2016 | Hossu | |
| 2017/0161543 A1 | 6/2017 | Smith et al. | |
| 2017/0220164 A1 | 8/2017 | Shi et al. | |

\* cited by examiner

ULTRASONIC TRANSDUCERS EMBEDDED IN ORGANIC LIGHT EMITTING DIODE PANEL AND DISPLAY DEVICES INCLUDING THE SAME

CROSS-REFERENCE TO RELATED APPLICATION

This application claims priority to and the benefit of, under 35 U.S.C. § 119, Korean Patent Application No. 10-2017-0181391 filed in the Korean Intellectual Property Office on Dec. 27, 2017, the entire contents of which are incorporated herein by reference.

BACKGROUND

(a) Field

The present disclosure relates to organic light emitting diode (OLED) panels and display devices including the same, and particularly, to organic light emitting diode (OLED) panels embedded with ultrasonic transducers configured to implement biometric recognition and mobile devices including the same.

(b) Description of Related Art

Organic light emitting diode (OLED) display devices have merits of excellent luminance, driving voltage, and response speed characteristics and implementing color images, so it is being employed for a variety of display devices.

Meanwhile, recently, it has been increasingly required to provide a display device configured to implement biometric recognition of human being via certain biometric information or gesture information that is extracted. Such biometric recognition may be implemented by use of automatic devices and/or may be implemented to authenticate a person in financial, health care, and mobile fields. Particularly, leading smartphone companies are focusing on adapting fingerprint and iris recognition technologies.

Since Apple took over AuthenTech, which was a manufacturer of semiconductive sensors for finger scans, they have been consistently mounting finger scan sensors electronic devices, including iPhone® and iPad® electronic devices. Recently, Vivo, Qualcomm, etc. have been releasing mobile display devices using a MUT (Micromechanical Ultrasonic Transducer) for recognizing gestures and the like as well as fingerprints with a biometric sensor. However, the mobile display device employs an on-cell method. Thus, as three substrates of a touch sensor panel, an OLED display panel, and a MUT panel are laminated, a form factor is increased to increase weight and volume thereof compared to a mobile display device not including a MUT, and the cost is increased.

SUMMARY

Some example embodiments provide one or more ultrasonic transducer embedded OLED panels having excellent sensitivity and being capable of providing high frequency output and biometric recognition.

Some example embodiments provide one or more display devices including one or more ultrasonic transducer embedded OLED panels having excellent sensitivity and capable of providing high frequency output and biometric recognition.

One or more ultrasonic transducer embedded OLED panels according to some example embodiments includes a substrate, an OLED light emitting part disposed on the substrate and emitting visible light, and an ultrasonic transducer disposed between the substrate and the OLED light emitting part and generating ultrasonic waves by an excitation voltage.

As the OLED light emitting part and the ultrasonic transducer are formed as an in-cell type, sensitivity may be improved, so power consumption may be reduced even with a low driving voltage.

When the OLED light emitting part and the ultrasonic transducer are formed as an in-cell type, the form factor is decreased, so it may be applied to a down-sized mobile device.

When the OLED light emitting part and the ultrasonic transducer are formed as an in-cell type, it may be easier to accomplish high frequency output.

According to some example embodiments, an ultrasonic transducer-embedded in-cell type organic light emitting diode (OLED) panel may include a substrate, an OLED light emitting part on the substrate, the OLED light emitting part configured to emit visible light, and an ultrasonic output part between the substrate and the OLED light emitting part. The ultrasonic output part may include an ultrasonic transducer configured to generate ultrasonic waves according to an excitation voltage.

A pixel of the OLED light emitting part may include at least one ultrasonic transducer.

The ultrasonic transducer may be between a sub-pixel of the OLED light emitting part and the substrate.

The OLED light emitting part may be configured to emit the visible light in a direction distal to the ultrasonic transducer.

The OLED light emitting part may include an organic light emitting diode (OLED), the OLED including an organic emission layer, a first electrode on a bottom side of the organic emission layer, and a second electrode on a top side of the organic emission layer. The second electrode may be a transparent electrode or a semi-transparent electrode. The first electrode may be a reflective electrode.

The ultrasonic transducer-embedded in-cell type of OLED panel may further include a first driver configured to receive and transmit an electrical signal of the OLED light emitting part and a second driver configured to receive and transmit an electrical signal of the ultrasonic transducer.

The first driver and the second driver may be on a same plane that is parallel to a top surface of the substrate.

The ultrasonic transducer may be a capacitive ultrasonic transducer or a piezoelectric ultrasonic transducer.

The ultrasonic transducer may be a capacitive ultrasonic transducer and may be configured to be driven by an excitation voltage of greater than or equal to about 20 V.

The ultrasonic transducer may be a piezoelectric ultrasonic transducer. The piezoelectric ultrasonic transducer may be configured to be operated in at least one of a low frequency mode or a high frequency mode.

The low frequency mode may correspond to about 50 kHz to about 200 kHz and may correspond to recognizing a three-dimensional gesture.

The high frequency mode may correspond to about 1 MHz to about 25 MHz and may correspond to performing a finger scan or touch recognition.

A length of the ultrasonic transducer in one direction may be smaller than a length of the sub-pixel of the OLED light emitting part in the one direction.

A display device may include the ultrasonic transducer-embedded in-cell type of OLED panel.

According to some example embodiments, a display device may include an organic light emitting diode (OLED) panel, a memory storing a program of instructions, and a processor. The OLED panel may include a substrate, an OLED light emitting part on the substrate, the OLED light emitting part configured to emit visible light, and an ultrasonic output part between the substrate and the OLED light emitting part. The ultrasonic output part may include a plurality of ultrasonic transducers configured to generate ultrasonic waves according to one or more excitation voltage. The processor may be configured to execute the program of instructions to selectively control one or more ultrasonic transducers of the plurality of ultrasonic transducers based on a determination of whether to implement recognition of a three-dimensional gesture or touch recognition of an object in contact with the OLED panel.

The plurality of ultrasonic transducers may include a plurality of sets of one or more ultrasonic transducers. The selectively controlling may control a selected set of one or more ultrasonic transducers of the plurality of sets of one or more ultrasonic transducers based on the determination of whether to implement recognition of the three-dimensional gesture or touch recognition of the object in contact with the OLED panel.

The plurality of sets of one or more ultrasonic transducers may include a set of one or more capacitive ultrasonic transducers and a set of one or more piezoelectric ultrasonic transducers. Each capacitive ultrasonic transducer may be configured to be driven by an excitation voltage of greater than or equal to about 20 V.

The one or more piezoelectric ultrasonic transducers may be configured to be operated in at least one of a low frequency mode or a high frequency mode. The low frequency mode may correspond to providing an excitation voltage of about 50 kHz to about 200 kHz to the one or more piezoelectric ultrasonic transducers and corresponds to recognition of the three-dimensional gesture. The high frequency mode may correspond to providing an excitation voltage of about 1 MHz to about 25 MHz to the one or more piezoelectric ultrasonic transducers and corresponds to touch recognition of an object in contact with the OLED panel.

A pixel of the OLED light emitting part may include at least one ultrasonic transducer of the plurality of ultrasonic transducers.

At least one ultrasonic transducer of the plurality of ultrasonic transducers may be between a sub-pixel of the OLED light emitting part and the substrate.

DETAILED DESCRIPTION

Figure 1A:
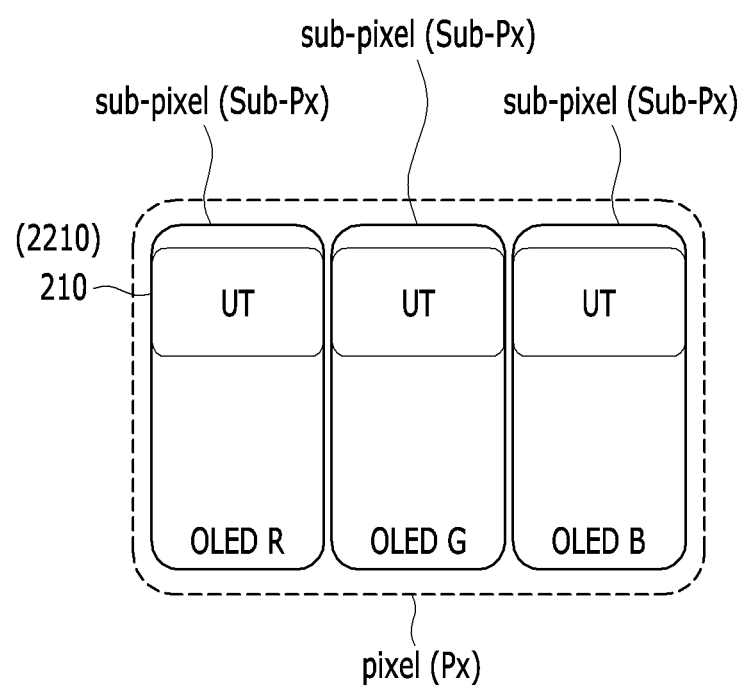
FIGS. 1A and 1B are schematic views showing a pixel layout of an ultrasonic transducer (UT) embedded organic light emitting diode (OLED) panel according to some example embodiments.

Example embodiments of the present disclosure will hereinafter be described in detail, and may be easily performed by a person having ordinary skill in the related art. However, the present disclosure may be embodied in many different forms, and is not to be construed as limited to the example embodiments set forth herein.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present. It will further be understood that when an element is referred to as being "on" another element, it can be above or beneath the other element.

Hereinafter, the ultrasonic transducer (UT) embedded organic light emitting diode (OLED) panel according to some example embodiments is described with references to drawings.

Figure 1B:
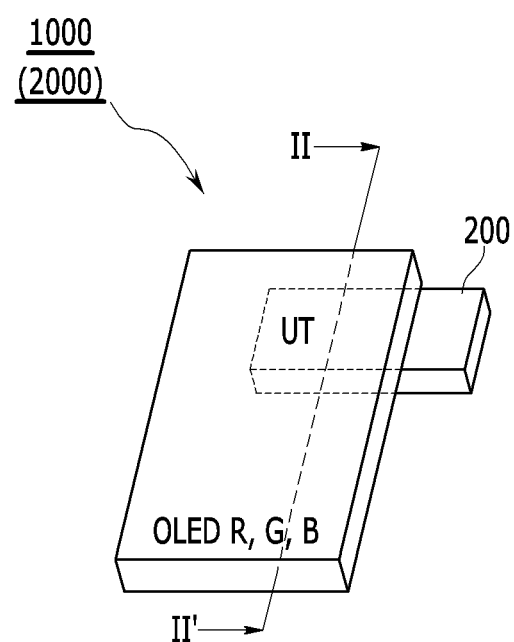
Figure 2:
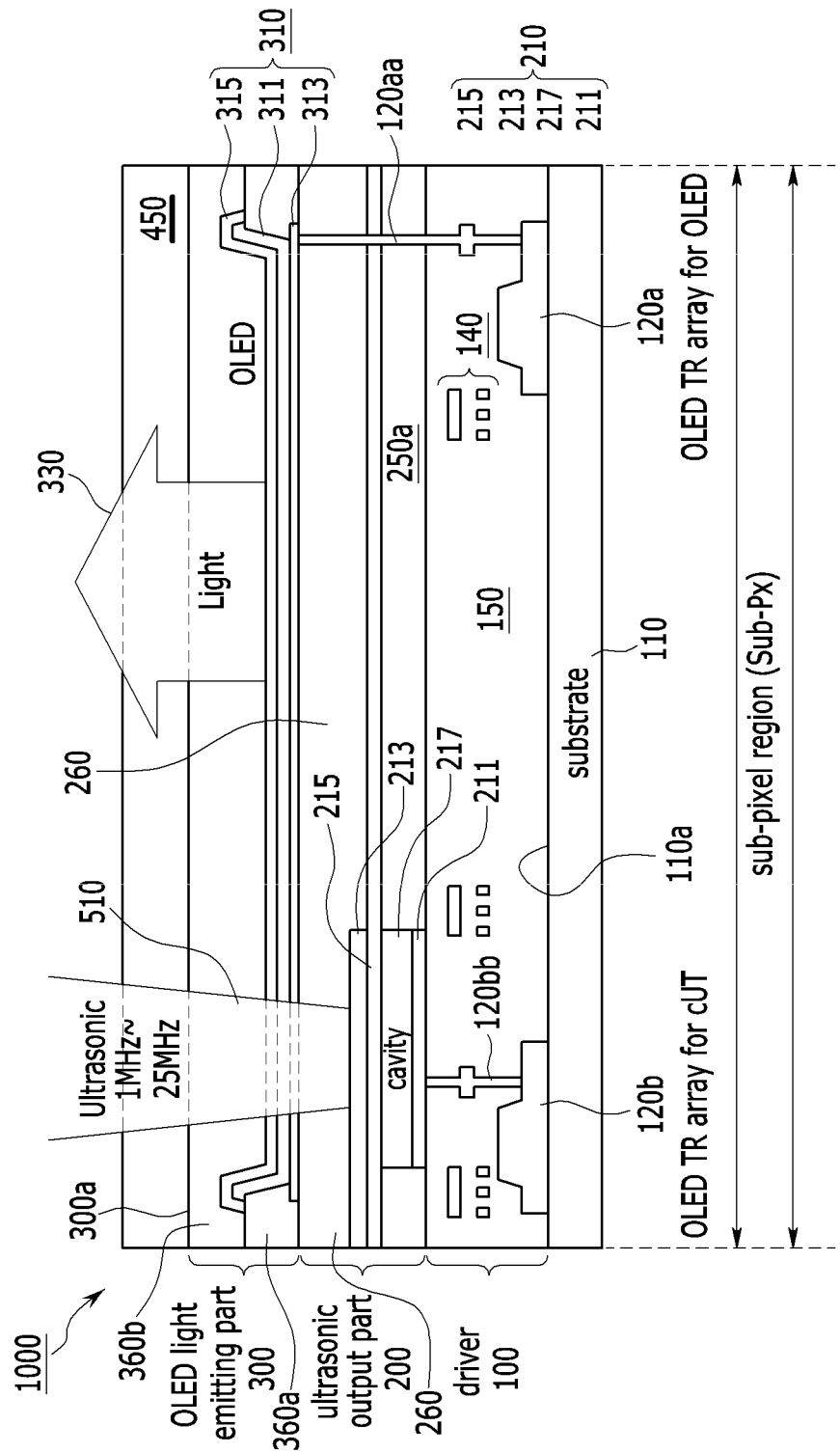
FIG. 2 is a cross-sectional view along view line II-II' of FIG. 1B, showing a capacitive UT (cUT) embedded OLED panel according to some example embodiments.

FIGS. 1A and 1B are schematic views showing a pixel layout of an ultrasonic transducer (UT) embedded organic light emitting diode (OLED) panel according to some example embodiments. FIG. 2 is a cross-sectional view along view line II-II' of FIG. 1B, showing a capacitive UT (cUT) embedded OLED panel according to some example embodiments.

Referring to FIGS. 1A and 1B, in a UT-embedded organic light emitting diode (OLED) panel 1000 and/or 2000, sub-pixels emitting different lights (R, G, B) having different wavelengths from each other are gathered to provide a unit pixel (Px), and the unit pixel (Px) is repeatedly arranged with a matrix to complete the panel 1000 and/or 2000.

FIG. 1A shows a plane view in which an ultrasonic output part 200 formed with a UT 210 or 2210 is disposed under each OLED sub-pixel (Sub-Px). FIG. 1B shows a perspective view in which an ultrasonic output part 200 formed with a UT 210 or 2210 is disposed under each OLED sub-pixel (Sub-Px). Restated, where an OLED panel 1000 and/or 200 includes an OLED light emitting part 300 on a substrate 110, the UT 210 or 2210 of the ultrasonic output part 200 may be between a sub-pixels of the OLED light emitting part 300 and the substrate 110.

FIG. 2 shows a cross-sectional view cut along a line II-II' of FIG. 1B, and the sub-pixel region (Sub-Px) and the ultrasonic wave output region are overlapped. FIG. 2 shows a capacitive UT (cUT) 210 as one example of the UT.

The cUT-embedded OLED panel 1000 is formed by embedding an ultrasonic output part 200 between the substrate 110 and an OLED light emitting part 300.

A cover glass 450 is attached on an upper surface 300a ("top surface") of the OLED light emitting part 300 by an adhesive (not shown) to protect the structure below and to form a display surface and a biometric surface.

FIG. 2 shows one example in which a driver 100 is disposed between a substrate 110 and a ultrasonic output part 200 to minimize a distance d 26 from the biometric surface to the ultrasonic output part 200, to decrease a size of the panel 1000, and also to not deteriorate light emission of the OLED light emitting part 300.

Thus when it is not critical to limit a size of the panel 1000, the ultrasonic output part 200 may be formed on the same plane as the driver 100.

In addition, when it is not critical to limit the distance d 26 from the biometric surface to the ultrasonic output part 200, the ultrasonic output part 200 may be formed between the substrate 110 and the driver 100.

The OLED light emitting part 300 is on the substrate 110 and is a region for displaying an image based on emitting visible light. Restated, the OLED light emitting part 300 may be configured to emit visible light (e.g., light in a visible wavelength spectrum). The OLED light emitting part 300 includes an organic light emitting diode (OLED) 310 including an organic emission layer 311, and a first electrode 313 and a second electrode 315 formed under and over ("on opposite sides of") the organic emission layer 311, respectively. The organic emission layer 311 may be formed of a variety of organic materials inherently configured to emit visible light 330 of any one of red R, green G, and blue B colors toward a front surface of the substrate 110 (e.g., based on electrical signals applied to the first and/or second electrodes 313 and 315 via conductive structure 120aa). Either one of the first electrode 313 and the second electrode 315 is connected with a driving voltage line (Vdd) and an output terminal (Out Put) to function as an anode, and the other one is connected with a common voltage (Vss) to function as a cathode. The first electrode 313 and the second electrode 315 may be formed as a semi-transparent or transparent electrode. In FIG. 2, a top emission type is shown, so the first electrode 313 on a bottom surface of the organic emission layer 311 may be a reflective electrode, and the second electrode 315 on a top surface of the organic emission layer 311 may be a transparent electrode or a semi-transparent electrode, such that the OLED light emitting part 300 may be configured to emit visible light 330 in a direction that is opposite to a direction extending from the OLED light emitting part 300 towards the ultrasonic output part 200. Restated, the OLED light emitting part 300 may be configured to emit visible light 330 in a direction that is distal to the cUT 210. Thus, the first electrode 313 may be formed of ("may at least partially comprise") MgAg, Ag, Mg, Al, Mo, Ti, TiN, Ni, and the like. As the first electrode 313 is formed of the reflective electrode to produce resonance, luminance and resolution may be improved. The second electrode 315 may be formed of ITO, IZO, AIZO, AITO, and the like. At least one of the first electrode 313 and the second electrode 315 is connected with a driving voltage line (Vdd) and an output terminal (Out Put) and functions as an anode, and the other is connected with a common voltage (Vss) and functions as a cathode. As shown in FIG. 2, the OLED 310 is at least partially between a lower insulating layer 360a and an upper insulating layer 360b.

The ultrasonic output part 200 shown in FIG. 2 includes a capacitive ultrasonic transducer (cUT) 210. The cUT 210 may include a cavity 217 defined by an anchor structure 250a, a lower electrode 211 disposed under the cavity 217, a membrane 215 disposed on the cavity 217, and an upper electrode 213 disposed on the membrane 215. When applying the upper electrode 213 and the lower electrode with a voltage, the membrane 215 is vibrated, and the cUT 210 may produce ultrasonic waves 510 in the adjacent media. The voltage may be an excitation voltage, such that the cUT 210 produces ("generates") ultrasonic waves according to an excitation voltage. On the contrary, the receiving ultrasonic waves produce motion in the cUT 210 and generate electrical signals. Restated, the cUT 210 may generate ultrasonic waves according to an excitation voltage and may further generate electrical signals based on receiving ultrasonic waves (e.g., ultrasonic waves that were generated by the cUT 210 and were reflected back to the cUT 210 from an object). The membrane 215 may be formed of ceramic materials such as $SiN$, $SiO_2$, $AlN$, $AlO_x$, and $SiON$. The ultrasonic output part 200 shown in FIG. 2 may further include an insulating layer 260 on a surface of the cUT 210. As shown in FIG. 2, the insulating layer 260 may be between the cUT 210 and the OLED light emitting part 300.

The driver 100 includes a variety of transistor arrays 120a and 120b formed on the substrate 110 and configured to input and/or output ("receive and transmit") an electrical signal to/from the OLED light emitting part 300 via conductive structure 120bb and/or to input and/or output an electrical signal to/from the cUT 210 via conductive structure 120aa, and an interlayer insulating layer 150 formed with a multi-layered wire layer 140. In some example, each separate transistor array 120a and 120b may be referred to as a separate driver.

The transistor array 120a for the OLED and the transistor array 120b for the cUT may be formed on the same plane, where the same plane is parallel or substantially parallel (e.g., parallel within manufacturing tolerances and/or material tolerances) to a top surface 110a of the substrate 110. When they are formed on the same plane, each process of forming the transistor arrays 120a and 120b may be simultaneously carried out so it is not needed to produce an additional process mask, compared to the case of forming them on different planes, so the number of process steps may be reduced. In addition, the thickness of the panel may be formed to be thinner than the case of forming the same in different planes, so it may favorably accomplish a flexible panel.

The substrate 110 may be formed with a variety of materials such as glass or plastic. In a case of plastic, it may be formed with a transparent and flexible material.

Figure 3:
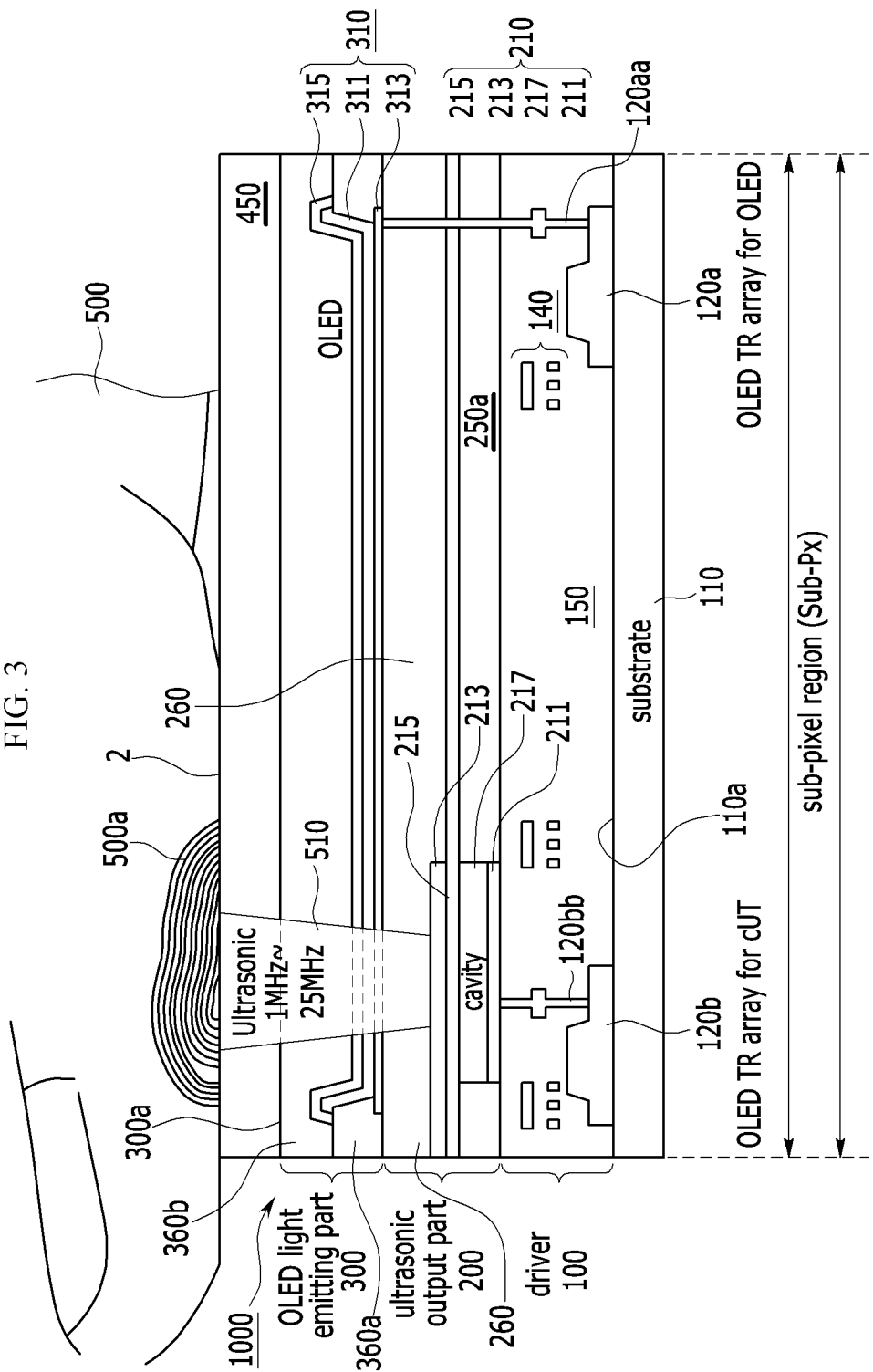
FIG. 3 is a cross-sectional view illustrating a finger scan process using a capacitance-type UT (cUT) embedded OLED panel according to some example embodiments.
Figure 4:
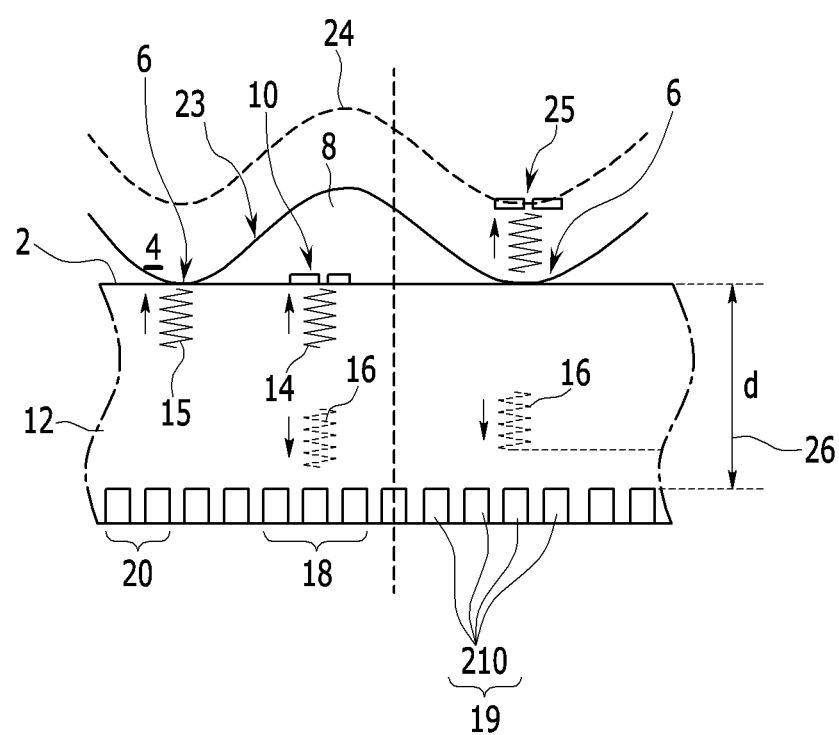
FIG. 4 is a schematic view more specifically illustrating a finger scan process according to some example embodiments.

FIG. 3 is a schematic view illustrating an operation of carrying out ("implementing") biometric recognition, and specifically, fingerprint scanning, using a near infrared organic light sensor embedded organic light emitting diode (OLED) panel according to some example embodiments. FIG. 4 is a schematic view specifically illustrating the fingerprint scan process.

Referring to FIGS. 3 and 4, when the biometric subject, for example, a finger 500, is put on (e.g., is placed in contact with) a surface 2 of a cover glass 450 of the OLED panel 1000, it may detect a reverberation from the surface 2, an outer skin layer 23, or a dermal layer 24 (e.g., interface 25 between the dermal layer 24 and the skin layer 23).

When providing a skin ridge contact point 6 by having a skin ridge 4 where the outer skin layer 23 contacts the surface 2, there may be no reverberation returned from a transmitted wavelength 15 on the surface at this point. Therefore, when the skin ridge 4 contacts the surface 2, there is no reverberation (or only a little reverberation) from the surface.

On the other hand, when there is a skin valley 8 on the surface 2, air is contained in the skin valley 8. In this case, the transmitted wavelength 15 may produce a very strong reverberation wave 16 at an interface 10 between the air and the surface which is the surface of the MEMS chip.

The interface between air and a binding material 12 causes a strong sound impedance difference at the air-binding interface 10, so the reverberation wave 16 is produced on the surface 2. At this point, the sound of a transmission wave 14 may not be transmitted though air in the skin valley 8. As the result, the transmission wave 14 is emitted from the surface 2 and reflected as a reverberation wave 16. This is a first way that the transmission wave 14 works in a MUT fingerprint ID system.

A signal generated by the transmission wave 14 selectively reflected on the surface 2 and causing a reverberation wave 16 having various intensities may likened to an image of a camera.

When air is present on the surface 2, there is very strong reverberation, so this region may be expressed as "white" in the generated image due to the very high signal intensity. On the contrary, when the skin ridge 4 contacts the surface 2, there is no reverberation from the surface, so this region may be expressed as "black" as detected by an ultrasonic transducer 19.

The signal may produce many "gray shadows" in an intermediate space among these points, which is between the skin ridge contact point 6 and the skin air binding interface 10, and it forms a three-dimensional topography including delicate and unique anatomically features.

Thereafter, the image detected by the ultrasonic transducer 19 is processed with an image processor to produce the three-dimensional image and to provide a fingerprint image of a finger 500, thereby carrying out a finger scan. In the image, the skin air binding interface 10 may be a region having high intensity, so it may be expressed brightly. On the other hand, almost no sound is transmitted through the skin ridge contact point 6. As almost no sound is transmitted through the region of the skin ridge contact point 6, it may be expressed as very dark.

The signal detected by the ultrasonic transducer 19 may be sampled by clustering signals from adjacent transducers. For example, an ultrasonic transducer cluster 20 alone may sample a certain region where a sufficient signal may not be received to provide detection by itself. In this way, the ultrasonic transducer cluster 18 may provide overall inspection of the reverberation wave 16 directly returned thereto.

Although FIGS. 3 and 4 show a fingerprint of a finger 500 as a biometric subject according to some example embodiments, the operation of carrying out biometrics recognition using a near infrared organic light sensor embedded organic light emitting diode (OLED) panel may be applied for various biometric subjects such as a palm print, an iris, a retina, and a face.

Figure 5:
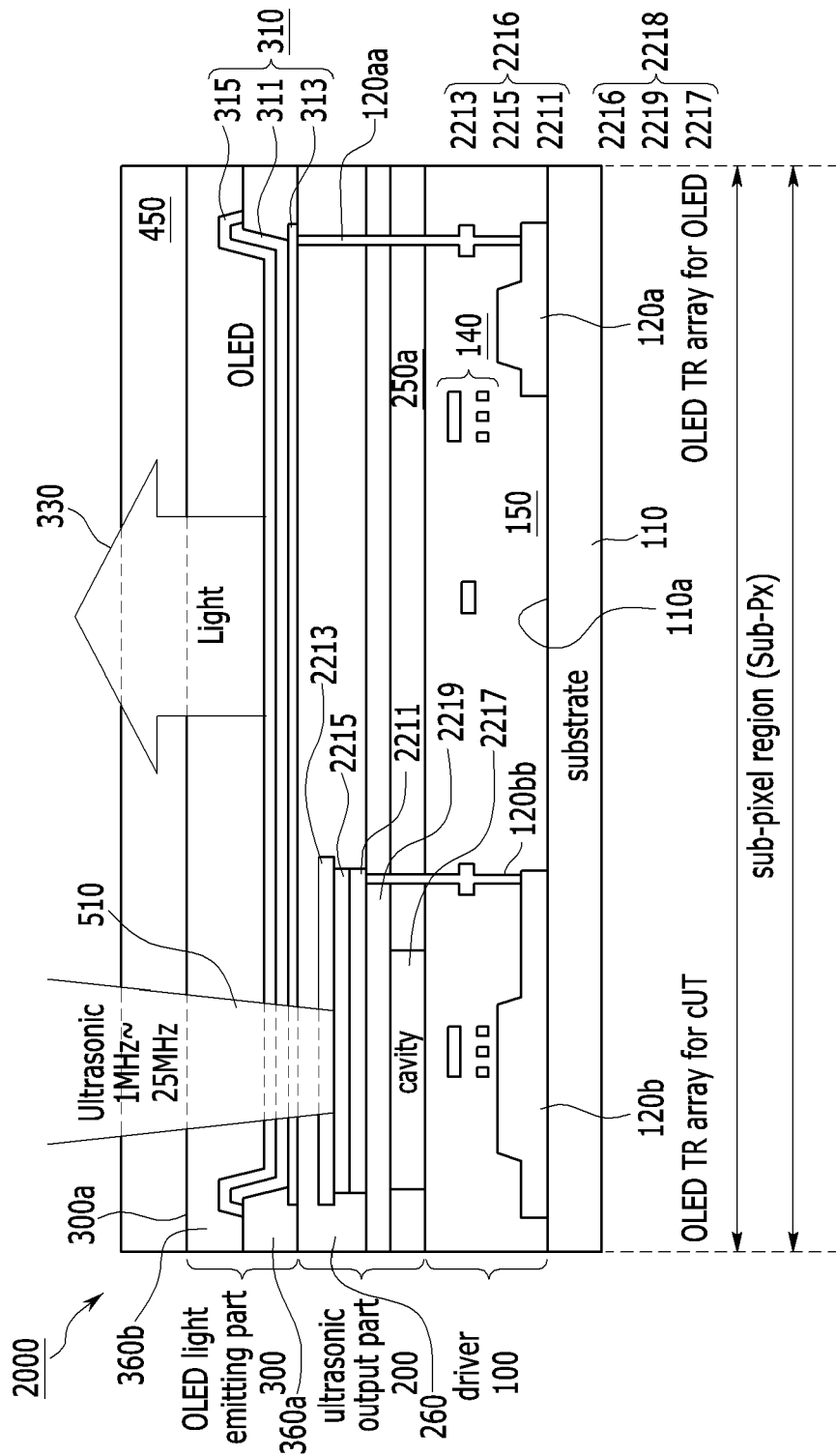
FIG. 5 is a cross-sectional view showing a piezoelectric UT (pUT) embedded OLED panel according to some example embodiments.

FIG. 5 is a cross-sectional view showing a piezoelectric UT (pUT) embedded OLED panel according to some example embodiments.

Unlike the OLED panel 1000 shown in FIG. 2, FIG. 5 shows one example in which an OLED panel 2000 includes a piezoelectric ultrasonic transducer (pUT) 2210 as the ultrasonic output part 200. The pUT 2210 may include a mechanical layer 2219 and a piezoelectric layer stack 2216 on a cavity 2217. The piezoelectric layer stack 2216 may include a lower electrode 2211, a piezoelectric layer 2215, and an upper electrode 2213. In some example embodiments, the mechanical layer 2219 may be formed on the piezoelectric layer stack 2216. As a response to driving voltages (also referred to herein interchangeably as excitation voltages) applied to the upper electrode 2213 and the lower electrode 2211 (e.g., via conductive structure 120*bb*), the mechanical layer 2219 and the piezoelectric layer stack 2216 may be flexed, bent, or vibrated. Vibrations of the pUT 2210 may produce ultrasonic waves 510 at a frequency determined by the excitation frequency of the driving voltages. The driving voltage may be an excitation voltage, such that the pUT 2210 produces ("generates") ultrasonic waves according to an excitation voltage. The piezoelectric layer 2215 may include one or more layers of a piezoelectric material such as AlN and PZT.

Figure 14:
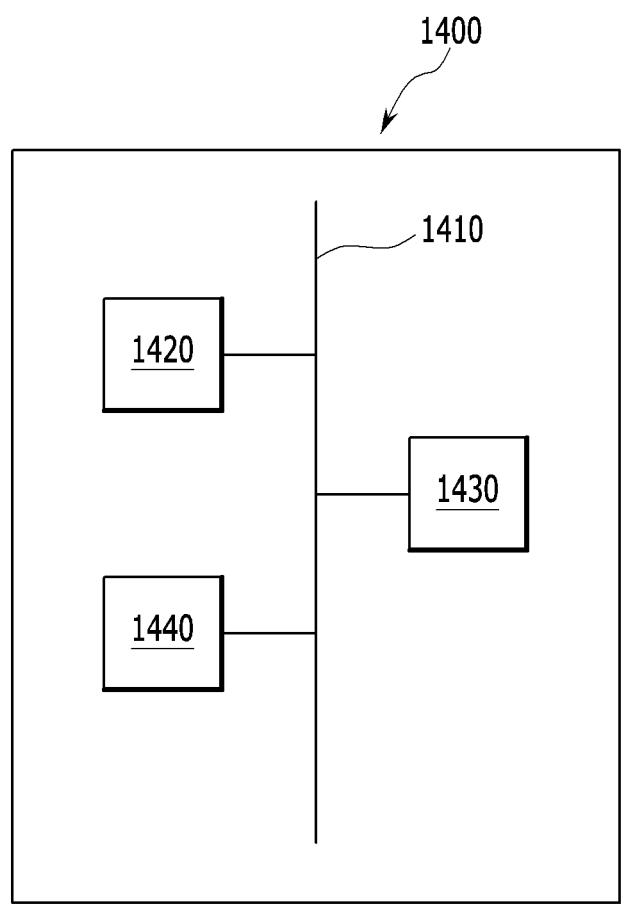
FIG. 14 is a schematic diagram of an electronic device according to some example embodiments of the present inventive concepts.

A control system included in the OLED panel 2000, as shown in FIG. 14, may determine whether a plurality of pUTs 2210 are configured to be operated in a low frequency mode or a high frequency mode, and may control at least a part of the plurality of pUTs 2210 according to the determination. When operating the plurality of pUTs 2210 in the low frequency (providing an excitation voltage of about 50 kHz to 200 kHz to the pUTs 2210) mode, the control system may recognize a three-dimensional gesture, but in the high frequency (providing an excitation voltage of about 1 MHz to 25 MHz to the pUTs 2210) mode, the control system may perform touch recognition such as a stylus pen or a finger scan.

The cUT 210 shown in FIG. 2 may be fabricated by a low cost process and may be configured to be driven at a high voltage of greater than or equal to at least about 20 V. The pUT 2210 shown in FIG. 3 may be fabricated by a complicated and high cost process, it may be driven at a low voltage of less than or equal to about 10 V, and the control system as described with reference to FIG. 14 may select either a low frequency mode or a high frequency mode in which to operate the ultrasonic output part 200, so the ultrasonic output part 200 may be formed by choosing either the cUT 210 or the pUT 2210 depending upon a usage of the OLED panel. In some example embodiments, an OLED panel may include an ultrasonic output part 200 that includes both one or more cUTs 210 and one or more pUTs 2210, such that the OLED panels 1000 and 2000 as shown in FIGS. 2 and 5 may be cross-sectional views of separate portions and/or separate sub-pixel regions of a same OLED panel, and the control system of the OLED panel may selectively determine whether to apply excitation voltage to the one or more cUTs 210 or the one or more pUTs 2210 depending upon a determined usage mode of the OLED panel (e.g., recognizing a three-dimensional gesture or performing touch recognition). The usage mode may be determined based on user interaction with an electronic device in which the OLED panel is included, execution of one or more programs of instructions stored at a memory of the electronic device to perform one or more operations, a combination thereof, or the like.

Restated, the control system, which may be implemented by a processor of a display device that includes the OLED panel, may selectively control one or more ultrasonic transducers of a plurality of UTs 210 and/or 2210 of the OLED panel based on a determination of whether to implement recognition of a three-dimensional gesture or touch recognition of an object in contact with the OLED panel. The plurality of ultrasonic transducers 210 and/or 2210 may include a plurality of sets of one or more UTs 210 and/or 2210, and the selectively controlling may control a selected set of one or more UTs 210 and/or 2210 of the plurality of sets of one or more UTs 210 and/or 2210 based on the determination of whether to implement recognition of the three-dimensional gesture or touch recognition of the object in contact with the OLED panel. The plurality of sets of one or more UTs 210 and/or 2210 may include a set of one or more cUTs 210, and a set of one or more pUTs 2210.

When the terms "about" or "substantially" are used in this specification in connection with a numerical value, it is intended that the associated numerical value include a tolerance of ±10% around the stated numerical value. When ranges are specified, the range includes all values therebetween such as increments of 0.1%.

FIGS. 6A, 6B, 6C, and 6D are schematic views showing a pixel layout of a UT-embedded OLED panel according to some example embodiments. FIGS. 6A-6D show a pixel array of the UT-embedded OLED panel 1000 and/or 2000 and a variety of layouts of the UT 210 or 2210. As shown in FIGS. 6A-6D, the OLED panel 1000 and/or 2000 may include a pixel, which may include a pixel of the OLED light emitting part 300, that includes at least one ultrasonic transducer UT 210 or 2210.

Figure 6A:
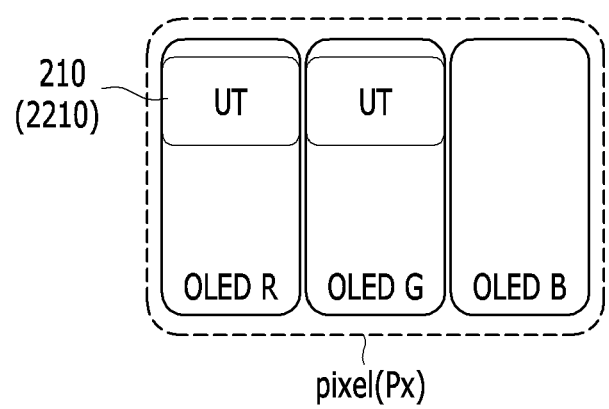
FIGS. 6A, 6B, 6C, and 6D are schematic views showing a pixel layout of a UT-embedded OLED panel according to some example embodiments.
Figure 6B:
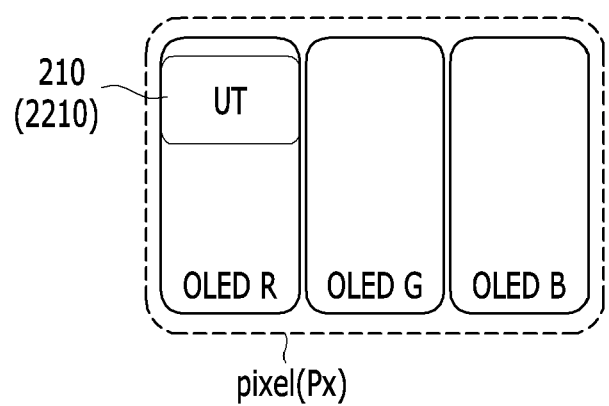

As shown in FIG. 6A, a UT 210 or 2210 may not be disposed under one or more sub-pixels (ex., OLED B), or as shown in FIG. 6B, a UT 210 or 2210 may be disposed in only one sub-pixel (ex., OLED R) of a pixel.

Figure 6C:
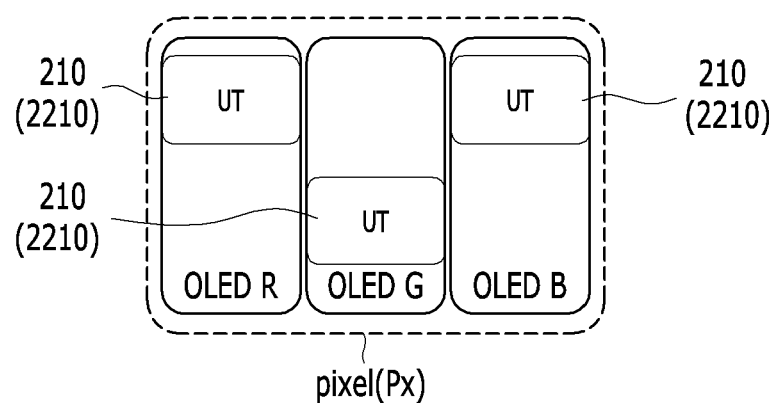
Figure 6D:
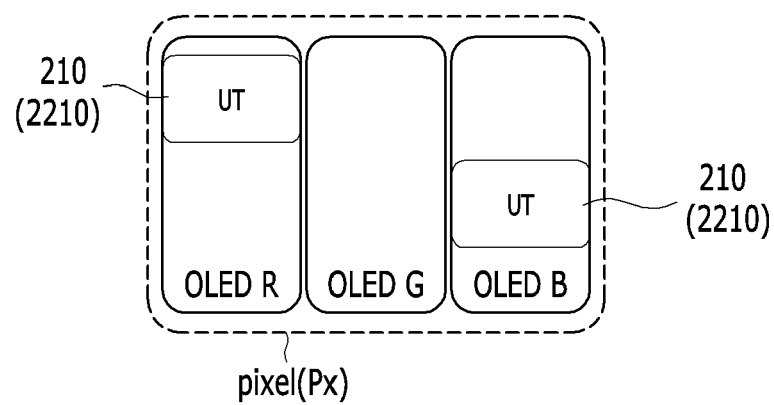

Alternatively, as shown in FIG. 6C, a UT 210 or 2210 may be disposed while changing positions in adjacent sub-pixels, or as shown in FIG. 6D, a UT 210 or 2210 may be disposed while skipping every other sub-pixel in the adjacent sub-pixels. As shown above, the various arrays of the various pixels and the UTs 210 or 2210 may be modified according to the recognition area and the image shape of the biometric subject.

Figure 7:
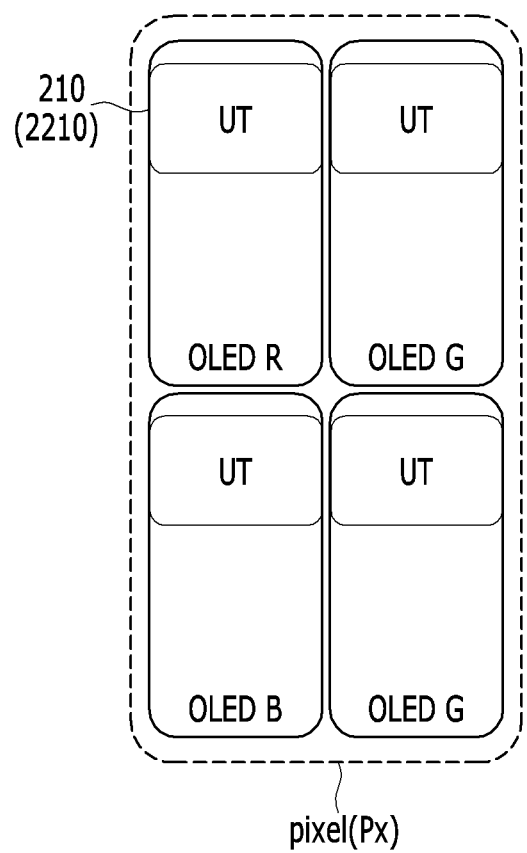
FIG. 7 is a schematic view showing a pixel layout of a UT-embedded OLED panel according to some example embodiments.

FIG. 7 shows a schematic view of another pixel layout of a UT 210 or 2210 embedded OLED panel according to some example embodiments.

FIG. 7 shows a pentile matrix type of layout in which one pixel Px includes an RGBG pattern. It exemplifies that the UT 210 or 2210 is disposed in every sub-pixel (R, G, B, G), but it may be modified to have the various shapes as in FIG. 6.

Figure 8:
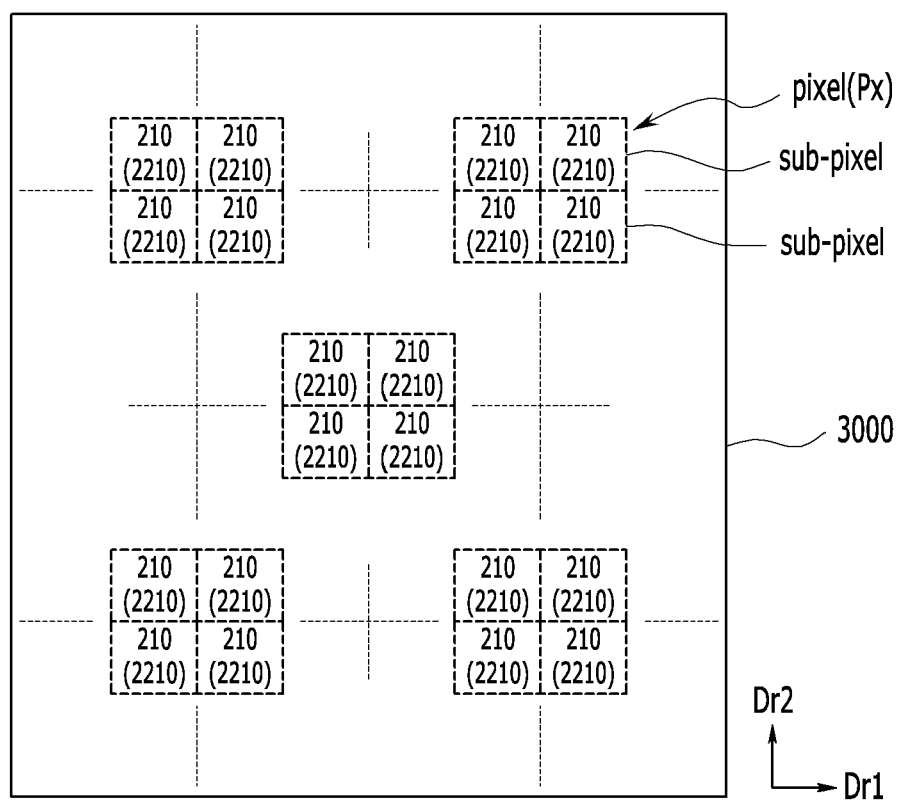
FIG. 8 is a schematic view showing a layout of a pixel array part of a UT-embedded OLED panel according to some example embodiments.

FIG. 8 is a schematic view showing a layout of a pixel array part of a UT-embedded OLED panel according to some example embodiments. FIG. 8 shows that a UT 210 or 2210 is limitedly disposed in a particular (or, alternatively, predetermined) pixel Px of a pixel array part 3000. The productivity may be enhanced by forming the UT 210 or 2210 only in a particular (or, alternatively, predetermined) desired pixel Px according to the recognition range of the biometric subject. In FIG. 8, Dr1 and Dr2 denote a row direction and a column direction, respectively, when a plurality of pixels Px are arranged in a matrix.

Figure 9:
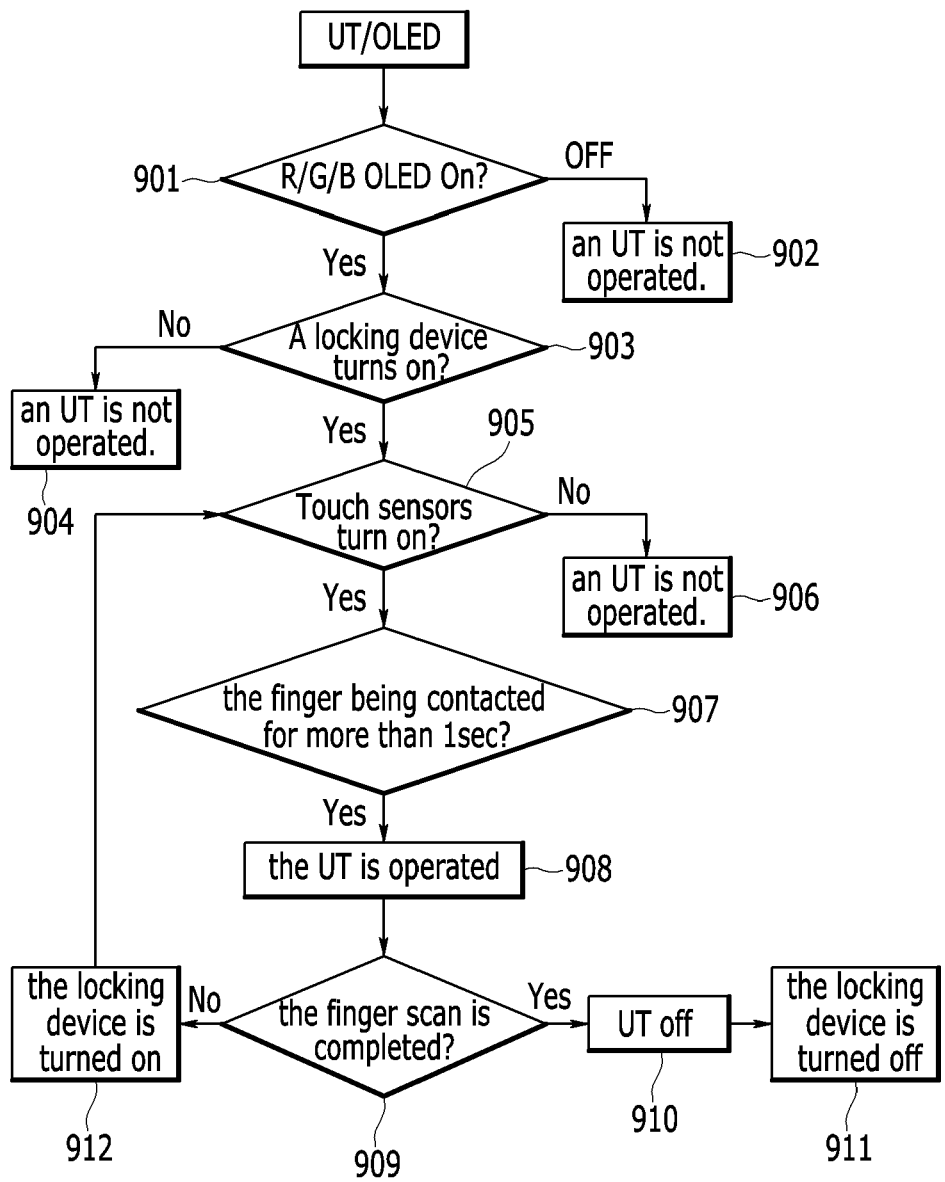
FIG. 9 is a flowchart illustrating a biometric algorithm in a UT-embedded OLED panel according to some example embodiments.

FIG. 9 is a flowchart illustrating a biometric algorithm in a UT-embedded OLED panel according to some example embodiments. FIG. 9 shows an operation algorithm of the OLED panel 1000 and/or 2000 in which the UT 210 or 2210 is embedded. The operations illustrated in FIG. 9 may be implemented by a control system of the OLED panel 1000 and/or 2000, which is described further below with regard to FIG. 14.

First, it is determined whether an R/G/B OLED is turned on (901). An R/G/G OLED being on means a state of shifting to a display mode after switching a start power on. The UT is not operated when an R/G/B OLED is turned off (902). When an R/G/B OLED is turned on, it is determined whether a locking device turns on (903). When the locking device is turned off, the UT is not operated since it is also one means of locking device (904). When the locking device turns on, it is determined whether touch sensors turn on (905). When the touch sensor is turned off, the UT is not operated (905). This is to prevent a power consumption loss of more than that required by blocking touch in a waiting mode. When the touch sensor turns on even in a locking mode, it is determined whether a finger contacts the surface of the panel for a particular (or, alternatively, predetermined) time or longer (e.g., 1 second or longer) (906), and the UT is operated (908) when being contacted for the particular (or, alternatively, predetermined) time or longer (907). It is determined whether a finger scan is completed (909), and when the finger scan is completed, the UT (910) and the locking device is turned off (911). When the finger scan is not completed, the locking device turns on again (912), and the procedure goes to step 905 again and operates.

Figure 10:
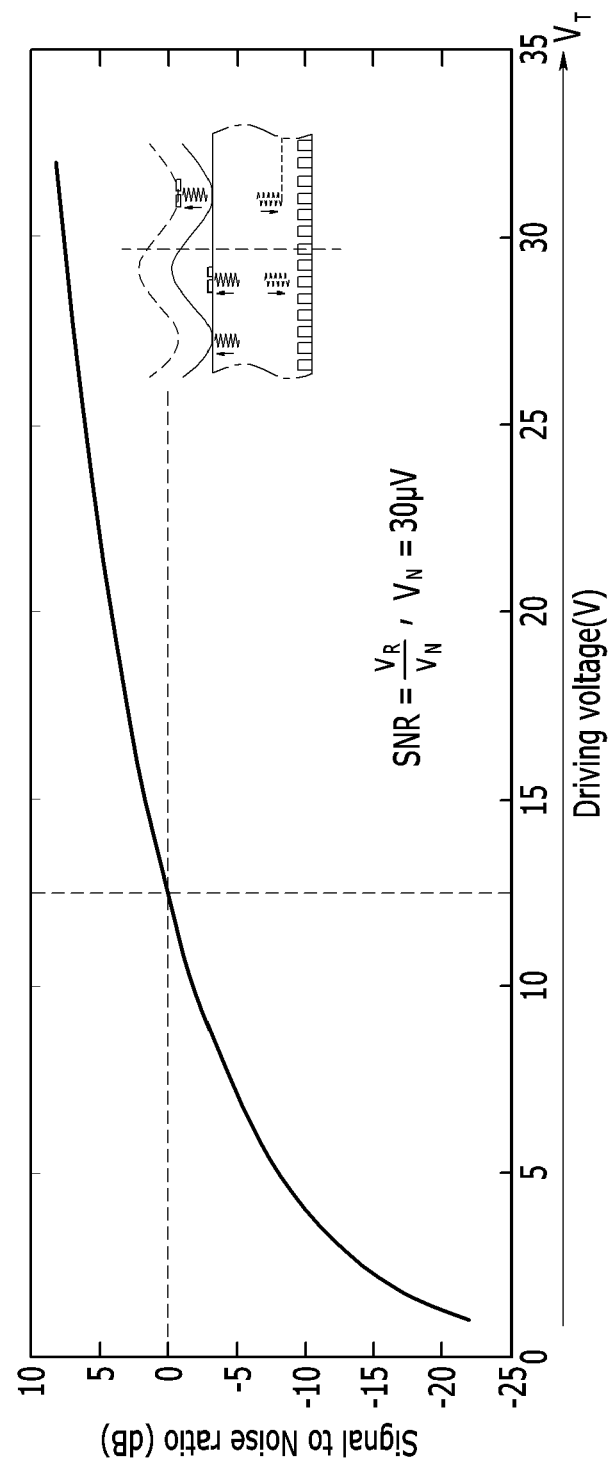
FIG. 10 is a graph showing effects that sensitivity is improved in an in-cell type compared to an on-cell type according to some example embodiments.
Figure 11:
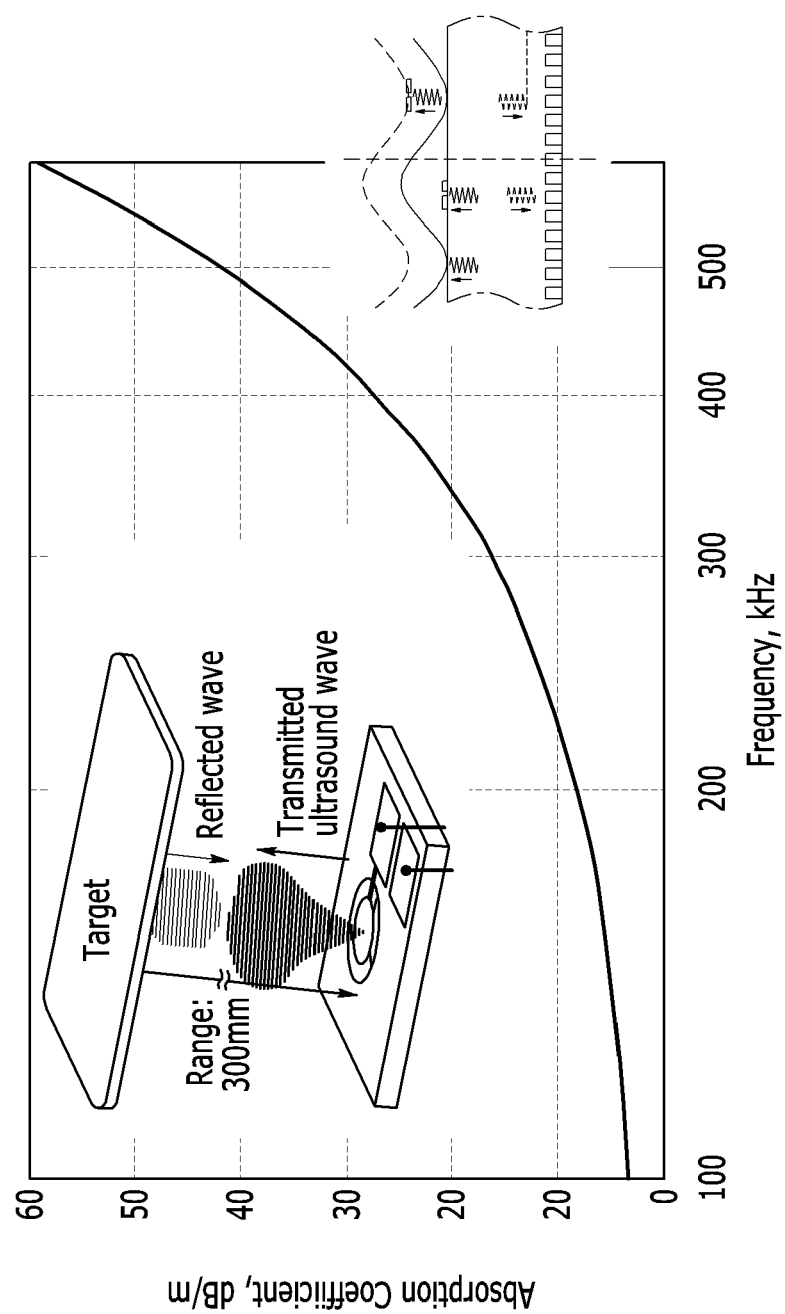
FIG. 11 is a graph describing that air absorption loss is increased according to a frequency according to some example embodiments.

FIG. 10 is a graph showing effects that sensitivity is improved in an in-cell type compared to an on-cell type according to some example embodiments. FIG. 11 is a graph describing that air absorption loss is increased according to a frequency according to some example embodiments. FIGS. 10 and 11 are graphs showing that the sensitivity is improved when the UTs according to some example embodiments are formed as an in-cell type by embedding the UT.

As shown in Equation (1), as the driving voltage ($V_T$) is increased, a signal-to-noise ratio (SNR) (dB) is also increased.

$$V_R = V_T \times \eta_T \times \frac{\sqrt{A_m}}{4\sqrt{\pi}\ d} \times 10^{-2\alpha d} \times (1 - \Gamma)^2 \times \Gamma \times \eta_R \quad (1)$$

$V_R$ denotes a reading signal voltage.

D denotes a distance 26 from the surface 2 of FIG. 4 to the UT 210 or 2210.

$V_N$ denotes a noise signal voltage. Supposing that $V_N$ is 30 µV, a loss of 20 dB occurs when the distance (d) is 1 mm. Accordingly, a loss of greater than or equal to about 20 dB may occur, compared to the conventional method of the on-cell type in which the distance d 26 from the surface 2 to the UT is far, which may improve the sensitivity by about 7 times.

In comparison of specific values, the thickness of the OLED panel of the conventional case may be greater than or equal to 1000 µm in addition to a thickness of the substrate for the UT of 1200 µm, and on the other hand, according to some example embodiments, it is not needed to use an additional substrate for the UT, so the loss may be decreased by as much as the thickness, so as to improve sensitivity.

In addition, as the loss may be reduced by decreasing the distance, the driving voltage may be increased by greater than or equal to about 15 V compared to the on-cell type under the same conditions, so the recognition rate may be improved.

FIG. 11 shows that an air absorption coefficient is increased according to increasing a frequency when the distance from the surface to the UT is about 300 mm. Thus in the case of being formed in an in-cell type having a short distance (d) from the surface 2 to the UT, the loss by the air absorption may be reduced, compared to the conventional on-cell type having a long distance from the surface to the UT.

In some example embodiments, where the OLED light emitting part and the ultrasonic transducer are formed as an in-cell type, sensitivity may be improved, so power consumption may be reduced even with a low driving voltage. In some example embodiments, where the OLED light emitting part and the ultrasonic transducer are formed as an in-cell type, the form factor is decreased, so it may be applied to a down-sized (compact) mobile device, thereby improving performance and/or functionality of compact devices.

In some example embodiments, where the OLED light emitting part and the ultrasonic transducer are formed as an in-cell type, it may be easier to accomplish high frequency output.

Figure 12:
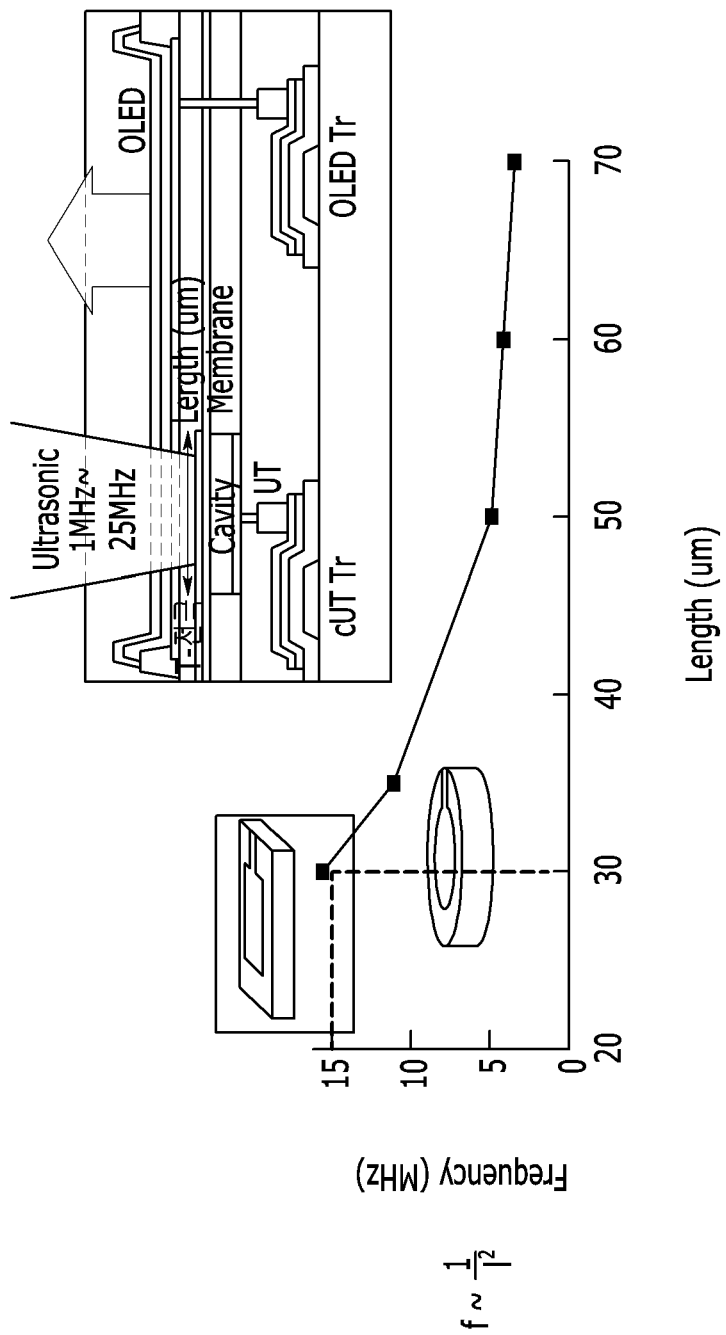
FIG. 12 is a graph illustrating that high frequency output is accomplished when a UT is highly integrated in an in-cell type according to some example embodiments.

FIG. 12 is a graph illustrating that high frequency output is accomplished when a UT is highly integrated in an in-cell type according to some example embodiments. FIG. 12 is a graph illustrating merits of the case that the UT is highly integrated as an in-cell type.

From the graph of FIG. 12, it is understood that a frequency (f) is increased as a length (l) of the UT 210 or 2210 becomes shorter. The UT 210 or 2210 is formed using a semiconductor integration process as an in-cell type, and the one direction length (l) of the UT 210 or 2210 (e.g., length in a particular one direction) may be shorter than the one direction length (L) of the sub-pixel (e.g., a maximum of 15 μm), (e.g., length in the same particular one direction) so it may effectively decrease the length (l) of the UT 210 or 2210 compared to the on-cell type formed according to the conventional MEMS method.

Figure 13A:
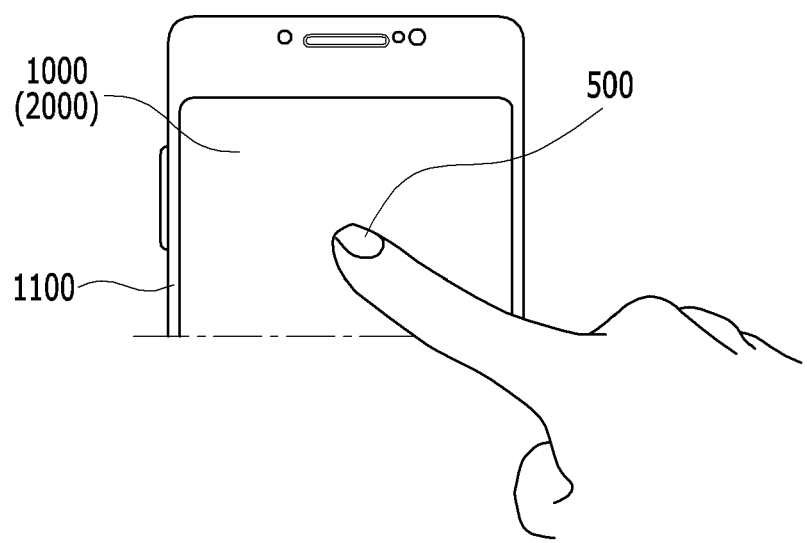
FIGS. 13A, 13B, and 13C show schematic views of mobile display devices including UT-embedded OLED panels according to some example embodiments.
Figure 13B:
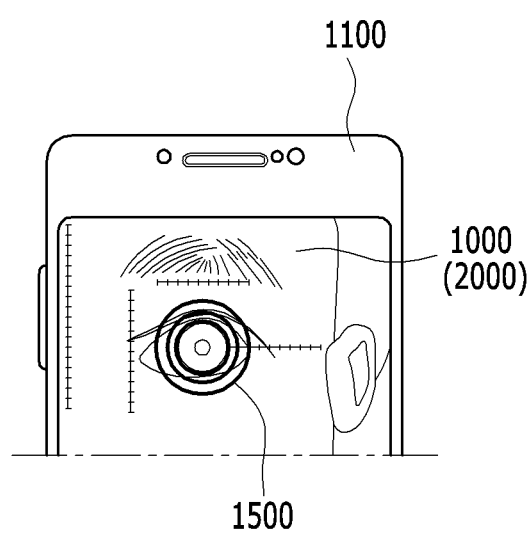
Figure 13C:
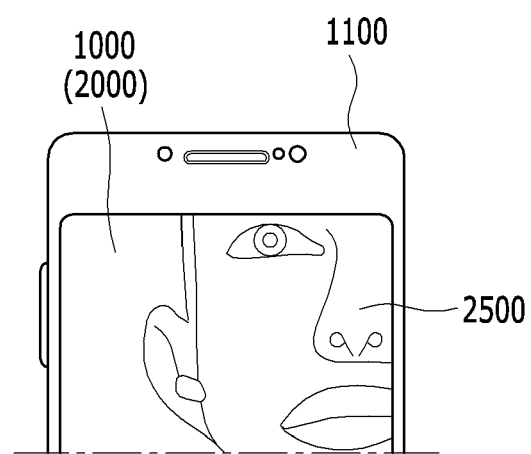

FIGS. 13A, 13B, and 13C show schematic views of mobile display devices including UT-embedded OLED panels according to some example embodiments. FIGS. 13A-13C are schematic views of a smart phone 1100 including a UT 210 or 2210 embedded OLED panel 1000 and/or 2000.

FIG. 13A shows that the UT 210 or 2210 embedded OLED panel 1000 and/or 2000 recognizes a fingerprint 500a of finger 500, FIG. 13B shows the case of recognizing an iris 1500, and FIG. 13C shows the case of recognizing a face 2500.

FIGS. 13A-13C show a smart phone 1100 as one example of the display device, but it may be applied to a screen such as a TV as well as for a multi-media player, a tablet PC, or the like that are capable of employing the UT 210 or 2210 embedded OLED panel 1000 and/or 2000, in addition to the smart phone 1100.

FIG. 14 is a schematic diagram of an electronic device 1400 according to some example embodiments. The electronic device 1400 may include, for example, the smart phone 1100 described with reference to FIGS. 13A-13B.

As shown in FIG. 14, an electronic device 1400 may include a processor 1420, a memory 1430, and display device 1440 that are electrically coupled together via a bus 1410. The display device 1440 may be display device of any of the example embodiments as described herein, and thus may include any of the example embodiments of OLED panels as described herein. The memory 1430, which may be a non-transitory computer readable medium, may store a program of instructions. The processor 1420 may execute the stored program of instructions to perform one or more functions, including implementing a control system of the display device 1440, implementing a control system of one or more OLED panels as described herein, implementing biometric recognition of an individual based on processing electrical signals received from one or more ultrasonic output parts of the one or more OLED panels as described herein (e.g., to detect a fingerprint, an iris, a face image, a three-dimensional gesture, a sub-combination thereof, or a combination thereof). The processor 1420 may be configured to generate an output (e.g., an image to be displayed on the display device, a command to operate a locking device, some combination thereof, or the like) based on implementing the biometric recognition. In some example embodiments, the one or more OLED panels of the display devices 1440 may include one or more processors and/or one or more memories, such that the one or more processors may execute one or more programs of instruction stored in one or more memories to implement a control system of the one or more OLED panels.

While this disclosure has been described in connection with what is presently considered to be practical example embodiments, it is to be understood that the inventive concepts are not limited to the disclosed embodiments, but, on the contrary, is intended to cover various modifications and equivalent arrangements included within the spirit and scope of the appended claims.

What is claimed is:

1. An ultrasonic transducer-embedded in-cell type of organic light emitting diode (OLED) panel, comprising:
    a substrate;
    an OLED light emitting part on the substrate, the OLED light emitting part configured to emit visible light; and
    an ultrasonic output part between the substrate and the OLED light emitting part, the ultrasonic output part including an ultrasonic transducer configured to generate ultrasonic waves according to an excitation voltage,
    wherein the ultrasonic transducer is between a sub-pixel of the OLED light emitting part and the substrate.

2. The ultrasonic transducer-embedded in-cell type of OLED panel of claim 1, wherein a pixel of the OLED light emitting part includes at least one ultrasonic transducer.

3. The ultrasonic transducer-embedded in-cell type of OLED panel of claim 1, wherein the OLED light emitting part is configured to emit the visible light in a direction distal to the ultrasonic transducer.

4. The ultrasonic transducer-embedded in-cell type of OLED panel of claim 3, wherein
    the OLED light emitting part includes an organic light emitting diode (OLED), the OLED including an organic emission layer, a first electrode on a bottom side of the organic emission layer, and a second electrode on a top side of the organic emission layer,
    the second electrode is a transparent electrode or a semi-transparent electrode, and
    the first electrode is a reflective electrode.

5. The ultrasonic transducer-embedded in-cell type of OLED panel of claim 1, further comprising:
    a first driver configured to receive and transmit an electrical signal of the OLED light emitting part; and a second driver configured to receive and transmit an electrical signal of the ultrasonic transducer.

6. The ultrasonic transducer-embedded in-cell type OLED panel of claim 5, wherein
the first driver and the second driver are on a same plane that is parallel to a top surface of the substrate.

7. The ultrasonic transducer-embedded in-cell type of OLED panel of claim 1, wherein the ultrasonic transducer is a capacitive ultrasonic transducer or a piezoelectric ultrasonic transducer.

8. The ultrasonic transducer-embedded in-cell type of OLED panel of claim 7, wherein the ultrasonic transducer is the capacitive ultrasonic transducer and is configured to be driven by an excitation voltage of greater than or equal to about 20 V.

9. The ultrasonic transducer-embedded in-cell type of OLED panel of claim 7, wherein
the ultrasonic transducer is the piezoelectric ultrasonic transducer, and
the piezoelectric ultrasonic transducer is configured to be operated in at least one of a low frequency mode or a high frequency mode.

10. The ultrasonic transducer-embedded in-cell type OLED panel of claim 9, wherein the low frequency mode corresponds to about 50 kHz to about 200 kHz and corresponds to recognizing a three-dimensional gesture.

11. The ultrasonic transducer-embedded in-cell type of OLED panel of claim 9, wherein the high frequency mode corresponds to about 1 MHz to about 25 MHz and corresponds to performing a finger scan or touch recognition.

12. The ultrasonic transducer-embedded in-cell type of OLED panel of claim 1, wherein a length of the ultrasonic transducer in one direction is smaller than a length of the sub-pixel of the OLED light emitting part in the one direction.

13. A display device comprising the ultrasonic transducer-embedded in-cell type of OLED panel of claim 1.

14. A display device, comprising:
an organic light emitting diode (OLED) panel, including
a substrate,
an OLED light emitting part on the substrate, the OLED light emitting part configured to emit visible light, and
an ultrasonic output part between the substrate and the OLED light emitting part, the ultrasonic output part including a plurality of ultrasonic transducers configured to generate ultrasonic waves according to one or more excitation voltage;
a memory storing a program of instructions; and
a processor configured to execute the program of instructions to
selectively control one or more ultrasonic transducers of the plurality of ultrasonic transducers based on a determination of whether to implement recognition of a three-dimensional gesture or touch recognition of an object in contact with the OLED panel,
wherein at least one ultrasonic transducer of the plurality of ultrasonic transducer is between a sub-pixel of the OLED light emitting part and the substrate.

15. A display device, comprising:
an organic light emitting diode (OLED) panel, including
a substrate,
an OLED light emitting part on the substrate, the OLED light emitting part configured to emit visible light, and
an ultrasonic output part between the substrate and the OLED light emitting part, the ultrasonic output part including a plurality of ultrasonic transducers configured to generate ultrasonic waves according to one or more excitation voltage;
a memory storing a program of instructions; and
a processor configured to execute the program of instructions to
selectively control one or more ultrasonic transducers of the plurality of ultrasonic transducers based on determination of whether to implement recognition of a three-dimensional gesture or touch recognition of an object in contact with the OLED panel,
wherein the plurality of ultrasonic transducers includes a plurality of sets of one or more ultrasonic transducers, and
wherein the selectively controlling controls a selected set of one or more ultrasonic transducers of the plurality of sets of one or more ultrasonic transducers based on the determination of whether to implement recognition of the three-dimensional gesture or touch recognition of the object in contact with the OLED panel.

16. The display device of claim 15, wherein the plurality of sets of one or more ultrasonic transducers includes
a set of one or more capacitive ultrasonic transducers, each capacitive ultrasonic transducer configured to be driven by an excitation voltage of greater than or equal to about 20 V, and
a set of one or more piezoelectric ultrasonic transducers.

17. The display device of claim 16, wherein
the one or more piezoelectric ultrasonic transducers are configured to be operated in at least one of a low frequency mode or a high frequency mode,
the low frequency mode corresponds to providing an excitation voltage of about 50 kHz to about 200 kHz to the one or more piezoelectric ultrasonic transducers and corresponds to recognition of the three-dimensional gesture, and
the high frequency mode corresponds to providing an excitation voltage of about 1 MHz to about 25 MHz to the one or more piezoelectric ultrasonic transducers and corresponds to touch recognition of the object in contact with the OLED panel.

18. The display device of claim 14, wherein a pixel of the OLED light emitting part includes at least one ultrasonic transducer of the plurality of ultrasonic transducers.

* * * * *